United States Patent [19]

Galbo et al.

[11] Patent Number: 5,096,950
[45] Date of Patent: Mar. 17, 1992

[54] POLYOLEFIN COMPOSITIONS STABILIZED WITH NOR-SUBSTITUTED HINDERED AMINES

[75] Inventors: James P. Galbo, Wingdale; Raymond Seltzer, New City; Ramanathan Ravichandran, Nanuet; Ambelal R. Patel, Ardsley, all of N.Y.

[73] Assignee: Ciba-Geigy Corporation, Ardsley, N.Y.

[21] Appl. No.: 562,783

[22] Filed: Aug. 6, 1990

Related U.S. Application Data

[63] Continuation-in-part of Ser. No. 259,946, Oct. 19, 1988, abandoned.

[51] Int. Cl.$^5$ .......................................... C08K 5/3435
[52] U.S. Cl. .................................. 524/99; 524/100; 524/102; 524/103; 524/104; 524/95
[58] Field of Search .............. 524/102, 103, 100, 104, 524/99, 95; 546/248; 548/542

[56] References Cited

U.S. PATENT DOCUMENTS

| | | | |
|---|---|---|---|
| 3,334,103 | 8/1967 | Feldman et al. | 548/542 |
| 4,413,075 | 11/1983 | DiBattista | 524/102 |
| 4,581,429 | 4/1986 | Solomon et al. | 548/542 |
| 4,668,721 | 5/1987 | Seltzer et al. | 524/102 |
| 4,691,015 | 9/1987 | Behrens et al. | 544/198 |
| 4,992,493 | 2/1991 | Cantatore et al. | 524/100 |
| 5,004,770 | 4/1991 | Cortolano et al. | 524/102 |
| 5,019,613 | 5/1991 | Ravichandran et al. | 524/100 |
| 5,026,749 | 6/1991 | Cantatore et al. | 524/102 |

OTHER PUBLICATIONS

P. Vink, "Loss of Stabilizers from Polyolefins During Photo-Oxidation", *Developments in Polymer Stabilization-3*, pp. 117–138 (1980).

P. Klemchuk et al., "Stabilization Mechanisms of Hindered Amines"-*Polymer Degradation and Stability* vol. 22, pp. 241–274 (1988) of presentation presented Sep. 2–4, 1987.

V. Shlyapintokh et al.-*Developments in Polymer Stabilization-5*, pp. 41–70 (1982).

*Primary Examiner*—Veronica P. Hoke
*Attorney, Agent, or Firm*—Luther A. R. Hall; Harry Falber

[57] ABSTRACT

Hindered amines based on various 2,2,6,6-tetraalkylated nitrogen-containing heterocyclic moieties wherein the hindered nitrogen atom on the ring is substituted with $OR_1$ substituents and the 4-position of the ring is substituted with a diversity of substituents are effective in protecting polyolefins against the adverse effects of light, heat and oxygen.

32 Claims, No Drawings

POLYOLEFIN COMPOSITIONS STABILIZED WITH NOR-SUBSTITUTED HINDERED AMINES

RELATED APPLICATIONS

This application is a continuation-in-part of application Ser. No. 259,946, filed Oct. 19, 1988, now abandoned.

It is well know that polyolefins undergo progressive changes in their physical properties, including color changes, embrittlement and loss of mechanical properties, when exposed to sunlight or other sources of ultraviolet radiation. Retardation of these deleterious effects has been achieved utilizing a broad range of additives exhibiting light-stabilizing properties, such additives including benzophenones, benzotriazoles, substituted benzoic acid esters, nickle complexes, aromatic oxamides and sterically hindered amines.

The latter group of chemicals and their stabilizing activity in a wide variety of substrates are likewise well known and have been described in a broad range of patents and technical literature. In view of the extensive nature of such art, reference is made to U.S. Pat. Nos. 4,426,471, 4,426,472, 4,344,876, 4,590,231 and 4,691,015 for a summary of representative hindered amine light stabilizers. The last cited patent and U.S. Pat. No. 4,740,544, for example, as well as Journal of Polymer Science, Polymer Chemistry Edition, 22, 277-281 (1984) further disclose the presence of such hindered amine stabilizers in polyolefins.

It has now been determined that the polyolefin compositions of this invention exhibit a variety of desirable properties stemming from the presence therein of the indicated N-OR$_1$ substituted hindered amines. Thus, the compounds serve to protect the polyolefins against the adverse effects of actinic, oxidative and thermal degradation. They provide increased antioxidant activity in polyolefins relative to corresponding NH derivatives. Thus, they serve to substantially reduce color formation and other degradative effects resulting from the processing conditions to which the polyolefins are subjected. They are especially effective in stabilizing polyolefins against the adverse effects of actinic stimuli relative to NH and NR derivatives. They also protect polyolefins against the gas fading that may be experienced upon exposure to the combination products of natural gas.

Of particular interest, the low basicity, chemically resistant substituted hindered amine compounds of the invention are exceptionally effective in fiber formulations wherein processing stability is required due to the stringent fiber extrusion conditions, in flame-retardant-containing polyolefins, in polyolefin applications requiring organosulfur compounds, e.g. thiosynergists, and in polyolefin applications for contact with or exposure to halogenated and/or sulfur containing compounds, e.g. pesticides, bleaching agents, disinfectants, and the like. Thus, it has been recognized that the prior art hindered amine compounds exhibit reduced effectiveness in the presence of organohalogenated flame retardants and thiosynergists, the latter products rendering the hindered amine uncapable of functioning as a photostabilizer.

This performance further allows for the effective use of such stabilized polyolefin in greenhouse film and swimming pool cover and liner applications. Other applications such as in geomembranes, geonets, geotextiles and geogrinds wherein the polyolefin is exposed to chemical wastes, acidic soil conditions, acid rain and landfill run off are likewise now available. The broad range of improved performance is also to be noted in other areas. For example, certain prior hindered amines tend to interact with pigments in pigmented polyolefin systems resulting in loss of pigment color yield and/or stabilizer effectiveness. Inasmuch as the active sites of the instant compounds are sterically blocked and essentially non-basic, interaction with pigments should be substantially reduced. Correspondingly, the catalysts utilized in newer polyolefin polymerization rection have tended to yield more corrosive resin systems. The instant compounds should likewise be expected to perform substantially better than standard hindered amine light stabilizers. Accordingly, these derivatives are seen to provide a broad range of improved performance characteristics relative to the known hindered amine derivatives.

The substituted hindered amine compounds applicable for use in this invention contain a group of the formula

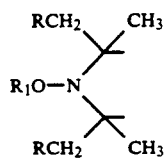

wherein R and R$_1$ are as defined hereinafter. Some are known compounds while others are claimed in copending applications Ser. Nos. 259,950 and 259,956 all now abandoned.

More particularly, the instant invention relates to the use of a derivative having one of formulae A to P

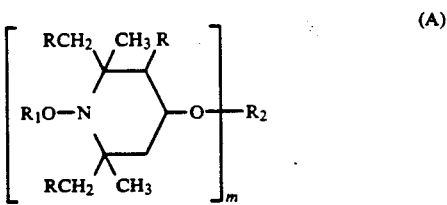

(A)

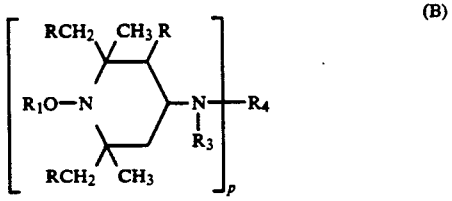

(B)

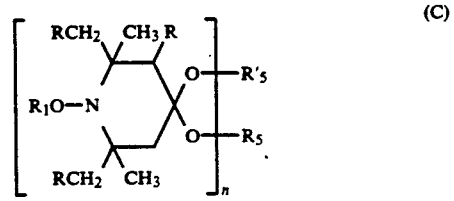

(C)

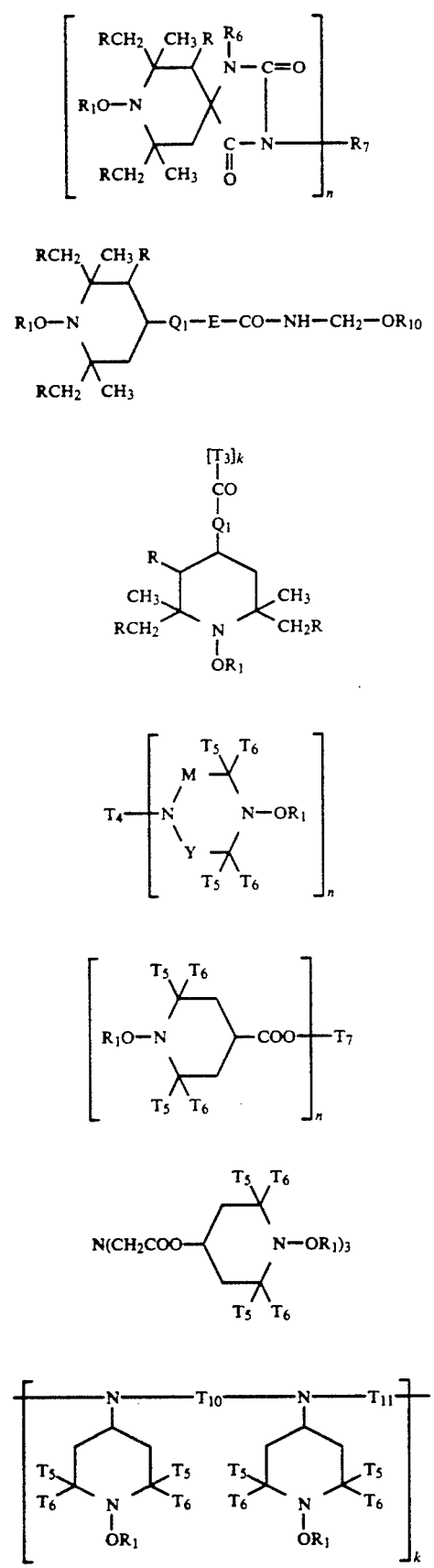
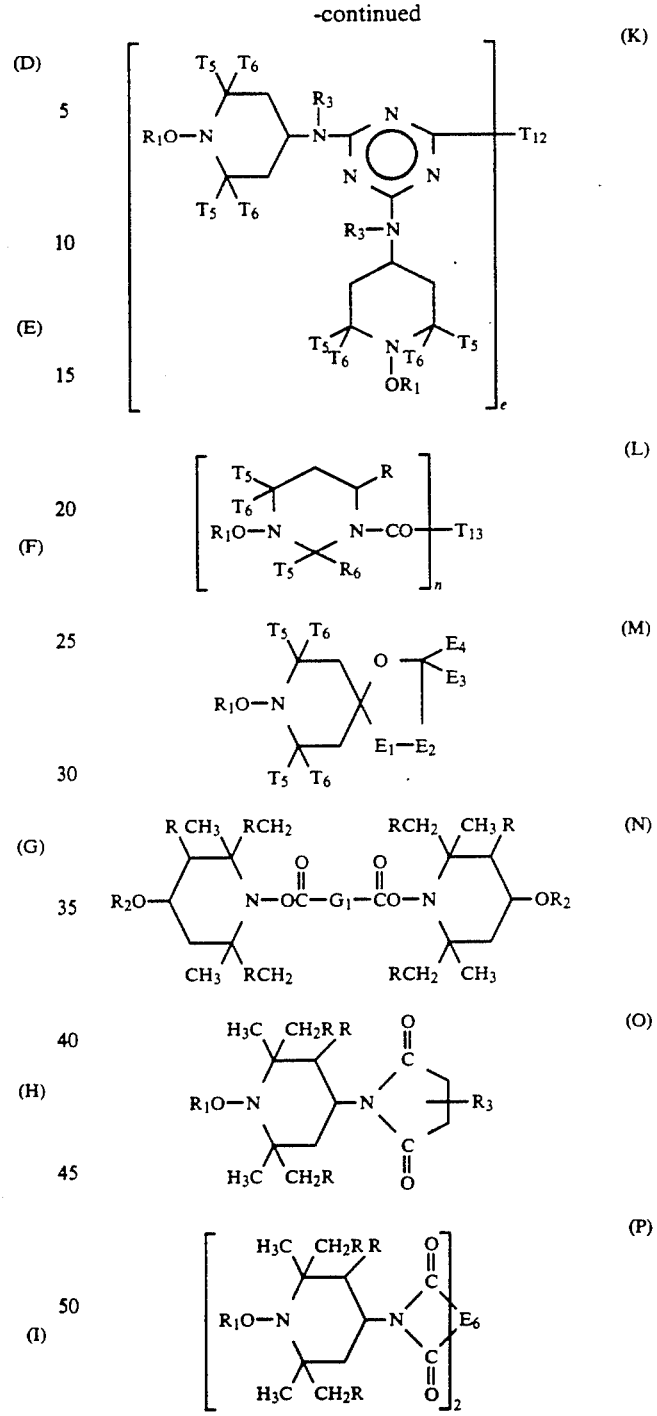
wherein
R is hydrogen or methyl,
$R_1$ is independently $C_1$-$C_{18}$ alkyl, $C_2$-$C_{18}$ alkenyl, $C_2$-$C_{18}$ alkynyl, $C_5$-$C_{12}$ cycloalkyl, $C_6$-$C_{10}$ bicycloalkyl, $C_5$-$C_8$ cycloalkenyl, $C_6$-$C_{10}$ aryl, $C_7$-$C_9$ aralkyl, $C_7$-$C_9$ aralkyl substituted by alkyl or aryl, or
wherein D is $C_1$-$C_{18}$ alkyl, $C_1$-$C_{18}$ alkoxy, phenyl, phenyl substituted by hydroxy, alkyl or alkoxy, or amino or amino mono- or disubstituted by alkyl or phenyl;

m is 1-4, when m is 1, $R_2$ is hydrogen, $C_1-C_{18}$ alkyl optionally interrupted by one or more oxygen atoms, $C_2-C_{12}$ alkenyl, $C_6-C_{10}$ aryl, $C_7-C_{18}$ aralkyl, glycidyl, a monovalent acyl radical of an aliphatic, cycloaliphatic, araliphatic or aromatic carboxylic acid, or of a carbamic acid, preferably an acyl radical of an aliphatic carboxylic acid having 2-18 C atoms, of a cycloaliphatic carboxylic acid having 5-12 C atoms or of an aromatic carboxylic acid have 7-15 C atoms, or

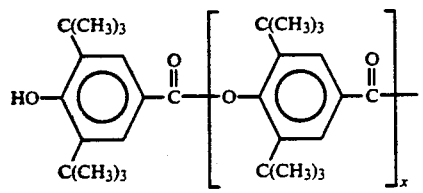

wherein x is 0 or 1, or

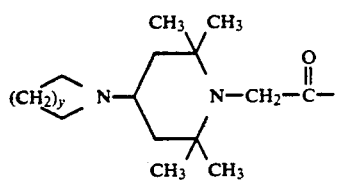

wherein y is 2-4;

when m is 2, $R_2$ is $C_1-C_{12}$ alkylene, $C_4-C_{12}$ alkenylene, xylylene, a divalent acyl radical of an aliphatic, cycloaliphatic, araliphatic or aromatic dicarboxylic acid or of a dicarbamic acid, preferably an acyl radical of an aliphatic dicarboxylic acid having 2-18 C atoms, of a cycloaliphatic or aromatic dicarboxylic acid having 8-14 C atoms, or of an aliphatic, cycloaliphatic or aromatic dicarbamic acid having 8-14 C atoms;

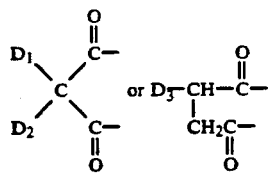

wherein $D_1$ and $D_2$ are independently hydrogen, an alkyl radical containing up to 8 carbon atoms, an aryl or aralkyl radical including 3,5-di-t-butyl-4-hydroxybenzyl radical, $D_3$ is hydrogen, or an alkyl or alkenyl radical containing up to 18 carbon atoms, and d is 0-20;

when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid including 1,2,3,4-butanetetracarboxylic acid, 1,2,3,4-but-2-enetetracarboxylic acid, and 1,2,3,5- and 1,2,4,5-pentanetetracarboxylic acid;

p is 1, 2 or 3, $R_3$ is hydrogen, $C_1-C_{12}$ alkyl, $C_5-C_7$ cycloalkyl, $C_7-C_9$ aralkyl, $C_2-C_{18}$ alkanoyl, $C_3-C_5$ alkenoyl or benzoyl;

when p is 1, $R_4$ is hydrogen, $C_1-C_{18}$ alkyl, $C_5-C_7$ cycloalkyl, $C_2-C_8$ alkenyl unsubstituted or substituted by a cyano, carbonyl or carbamide group, aryl, aralkyl, or it is glycidyl, a group of the formula $-CH_2-CH(OH)13 Z$ or of the formula $-CO-Z$ or $-CONH-Z$ wherein Z is hydrogen, methyl or phenyl; or a group of the formulae

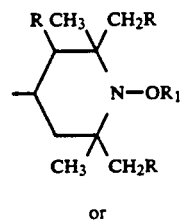

or

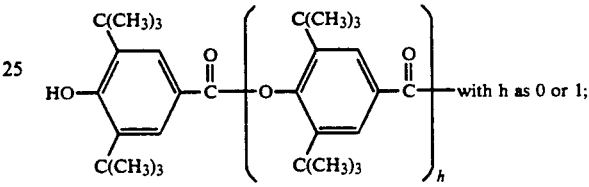

or $R_3$ and $R_4$ together when p is 1 can be alkylene of 4 to 6 carbon atoms or 2-oxo-polyalkylene or the cyclic acyl radical of an aliphatic or aromatic 1,2- or 1,3-dicarboxylic acid, when p is 2, $R_4$ is a direct bond or is $C_1-C_{12}$ alkylene, $C_6-C_{12}$ arylene, xylylene, a $-CH_2CH(OH)-CH_2$ group, or a group $-CH_2-CH(OH)-CH_2-O-X-O-CH_2-CH(OH)-CH_2-$ wherein X is $C_2-C_{10}$ alkylene, $C_6-C_{15}$ arylene or $C_6-C_{12}$ cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group $-CO-$; or $R_4$ is

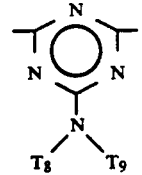

where $T_8$ and $T_9$ are independently hydrogen, alkyl of 1 to 18 carbon atoms, or $T_8$ and $T_9$ together are alkylene of 4 to carbon atoms or 3-oxapentamethylene, preferably $T_8$ and $T_9$ together are 3-oxapentamethylene;

when p is 3, $R_4$ is 2,4,6-triazinyl, n is 1 or 2, when n is 1, $R_5$ and $R'_5$ are independently $C_1-C_{12}$ alkyl, $C_2-C_{12}$ alkenyl, $C_7-C_{12}$ aralkyl, or $R_5$ is also hydrogen, or $R_5$ and $R'_5$ together are $C_2-C_8$ alkylene or hydroxyalkylene or $C_4-C_{22}$ acyloxyalkylene;

when n is 2, $R_5$ and $R'_5$ together are $(-CH_2)_2C(CH_2-)2$;

$R_6$ is hydrogen, $C_1$-$C_{12}$ alkyl, allyl, benzyl, glycidyl or $C_2$-$C_6$ alkoxyalkyl;

when n is 1, $R_7$ is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula $-(CH_2)_t-COO-Q$ or of the formula $-(CH_2)_t-O-CO-Q$ wherein t is 1 or 2, and Q is $C_1$-$C_4$ alkyl or phenyl; or when n is 2, $R_7$ is $C_2$-$C_{12}$ alkylene, $C_6$-$C_{12}$ arylene, a group $-CH_2CH(OH)-CH_2-O-X-O-CH_2-CH(OH)-CH_2-$ wherein X is $C_2$-$C_{10}$ alkylene, $C_6$-$C_{15}$ arylene or $C_6$-$C_{12}$ cycloalkylene, or a group $-CH_2CH(OZ')CH_2-(OCH_2-CH(OZ')CH_2)_2-$ wherein Z' is hydrogen, $C_1$-$C_{18}$ alkyl, allyl, benzyl, $C_2$-$C_{12}$ alkanoyl or benzoyl;

$Q_1$ is $-N(R_8)-$ or $-O-$; E is $C_1$-$C_3$ alkylene, the group $-CH_2-CH(R_9)-O-$ wherein $R_9$ is hydrogen, methyl or phenyl, the group $-(CH_2)_3-NH-$ or a direct bond:

$R_{10}$ is hydrogen or $C_1$-$C_{18}$ alkyl, $R_8$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group $-CH_2-CH(R_9)-OH$ wherein $R_9$ has the meaning defined above; a group of the formula

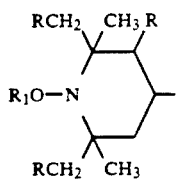

or a group of the formula

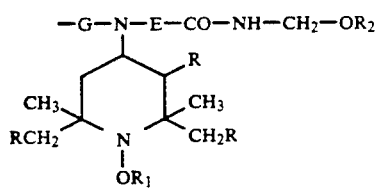

wherein G is $C_2$-$C_6$ alkylene or $C_6$-$C_{12}$ arylene; or $R_8$ is a group $-E-CO-NH-CH_2-OR_{10}$;

Formula F denotes a recurring structural unit of a polymer where $T_3$ is ethylene or 1,2-propylene, or is the repeating structural unit derived from an alpha-olefin copolymer with an alkyl acrylate or methacrylate; preferably a copolymer of ethylene and ethyl acrylate, and where k is 2 to 100;

$T_4$ has the same meaning as $R_4$ when p is 1 or 2, $T_5$ is methyl, $T_6$ is methyl or ethyl, or $T_5$ and $T_6$ together are tetramethylene or pentamethylene, preferably $T_5$ and $T_6$ are each methyl, M and Y are independently methylene or carbonyl preferably M is methylene and Y is carbonyl, and $T_4$ is ethylene where n is 2;

$T_7$ is the same as $R_7$, and $T_7$ is preferably octamethylene where n is 2, $T_{10}$ and $T_{11}$ are independently alkylene of 2 to 12 carbon atoms, or $T_{11}$ is

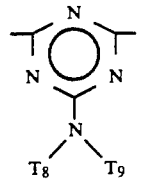

$T_{12}$ is piperazinyl, $$-NR_{11}-(CH_2)_d-NR_{11}-$$

or $$-NH(CH_2)_a-N(CH_2)_b-N[(CH_2)_c-N]_fH$$

where $R_{11}$ is the same as $R_3$ or is also

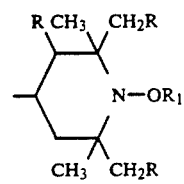

where a, b and c are independently 2 or 3, and f is 0 or 1, preferably a and c are each 3, b is 2 and f is 1; l e is 2, 3 or 4, preferably 4;

$T_{13}$ is the same as $R_2$ with the proviso that $T_{13}$ cannot be hydrogen when n is 1;

$E_1$ and $E_2$, being different, each are $-CO-$ or $-N(E_5)-$ where $E_5$ is hydrogen, $C_1$-$C_{12}$ alkyl or $C_4$-$C_{22}$ alkoxycarbonylalkyl, preferably $E_1$ is $-CO-$ and $E_2$ is $-N(E_5)-$, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by up to four alkyl groups of 1 to 4 carbon atoms, preferably methyl, and $E_6$ is an aliphatic or aromatic tetravalent radical.

In the structures A to P, if any substituents are $C_1$-$C_{18}$ alkyl, they are for example methyl, ethyl, n-propyl, n-butyl, sec-butyl tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl. Typical cycloalkyl groups include cyclopentyl and cyclohexyl; typical cycloalkenyl groups include cyclohexenyl; while typical aralkyl groups include benzyl, alpha-methyl-benzyl, alpha,alpha-dimethylbenzyl or phenethyl. $C_1$-$C_{12}$ alkyl and cyclohexyl are preferred.

If $R_2$ is a monovalent acyl radical of a carboxylic acid, it is for example an acyl radical of acetic acid, stearic acid, salicylic acid, benzoic acid or β-(3,5-di-tert-butyl-4-hydroxyphenyl) propionic acid.

If $R_2$ is a divalent acyl radical of a dicarboxylic acid, it is for example an acyl radical of oxalic acid, adipic acid, succinic acid, suberic acid, sebacic acid, phthalic acid dibutylmalonic acid, dibenzylmalonic acid or butyl-(3,5-di-tert-butyl-4-hydroxybenzyl)-malonic acid, or bicycloheptenedicarboxylic acid, with succinates, sebacates, phthalates and isophthalates being preferred.

If $R_2$ is a divalent acyl radical of a dicarbamic acid, it is for example an acyl radical of hexamethylenedicarbamic acid or of 2,4-toluylenedicarbamic acid.

The following compounds are examples of polyalkylpiperidine starting materials useful in making the hydroxylamine derivatives of formula A.

4-benzyloxy-2,2,6,6-tetramethylpiperidine
4-acryloyloxy-2,2,6,6-tetramethylpiperidine
4-hydroxy-2,2,6,6-tetramethylpiperidine
4-stearoyloxy-2,2,6,6-tetramethylpiperidine
di-(2,2,6,6-tetramethylpiperidin-4-yl) adipate
di-(2,2,6,6-tetramethylpiperidin-4-yl) sebacate
di-(2,2,6,6-tetramethylpiperidin-4-yl)phthalate
alpha,alpha'-(di-2,2,6,6-tetramethyl piperidine-4-oxy)-p-xylene
di-(2,2,6,6-tetramethylpiperidin-4-yl)succinate
di-(2,2,6,6-tetramethylpiperidin-4-yl)malonate
1,4-dihydroxy-2,2,6,6-tetramethylpiperidine
1-acetoxy-4-hydroxy-2,2,6,6-tetramethylpiperidine
(2,2,6,6-tetramethylpiperidin-4-yl)-[4-(2-oxoazepin-1-yl)-2,2,6,6-tetramethylpiperidin-4-yl As $C_7-C_9$ aralkyl, $R_3$ is particularly phenethyl or above all benzyl.

As $C_2-C_{18}$ alkanoyl, $R_3$ for example propionyl, butyryl, octanoyl, dodecanoyl, hexadecanoyl, octadecanoyl, but preferably acetyl; and a $C_3-C_5$ alkenoyl, $R_3$ is in particular acryloyl.

If $R_4$ is $C_2-C_8$ alkenyl unsubstituted or substituted by a cyano, carbonyl or carbamide group, it is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonyl-vinyl or 2,2-diacetylamin If any substituents are $C_2-C_{12}$ alkylene, they are for example ethylene, propylene, 2,2-dimethylpropylene, tetramethylene, hexamethylene, octamethylene, decamethylene or dodecamethylene.

If any substituents are $C_6-C_{15}$ arylene, they are for example o-, m- or p-phenylene, 1,4-naphthylene or 4,4'-di-phenylene.

As $C_6-C_{12}$ cycloalkylene, X is especially cyclohexylene.

The following compounds are examples of polyalkylpiperidine starting materials useful in making the hydroxylamine derivatives of formula B.

N,N'-bis(2,2,6,6-tetramethylpiperidin-4-yl)-hexamethylene-1,6-diamine,

N,N'-bis-(2,2,6,6-tetramethylpiperidin-4-yl)-hexamethylene-1,6-diacetamide, 4-benzylamino-2,2,6,6-tetramethylpiperidine, N-n-butyl-N-(2,2,6,6-tetramethylpiperidin-4-yl)-4-hydroxy-3,5-di-tert.butyl benzamide, N,N'-bis-(2,2,6,6-tetramethylpiperidin-4-yl)-N,N'-dibutyl-adipamide, N,N'-bis-(2,2,6,6-tetramethylpiperidin-4-yl)-N,N'-dicyclohexyl-(2-hydroxypropylene-diamine), N,N'-bis-(2,2,6,6-tetramethylpiperidin-4-yl)-p-xylylenediamine, 4-(3-methyl-4-hydroxy-5-tert-butyl-benzoyl acetamido)-2,2,6,6-tetramethylpiperidine, alpha-cyano-$\beta$-methyl-$\beta$-[N-(2,2,6,6-tetramethylpiperidin-4-yl)]-amino-acrylic acid methyl ester 1-acetoxy-N-butylamino-2,2,6,6-tetramethylpiperidine 1-oxyl-2,2,6,6-tetramethylpiperidin-4-one If $R_5$ is $C_2-C_8$ alkylene or hydroxyalkylene, it is for example ethylene, 1-methyl-ethylene, propylene, 2-ethylpropylene or 2-ethyl-2-hydroxymethylpropylene.

As $C_4-C_{22}$ acyloxyalkylene, $R_5$ is for example 2-ethyl-2-acetoxymethyl-propylene.

The following compounds are examples for polyalkylpiperidine starting materials useful in making the hydroxylamine derivatives of formula C.

9-aza-8,8,10,10-tetramethyl-1,5-dioxaspiro[5.5]undecane, 9-aza-8,8,10,10-tetramethyl-3-ethyl-1,5-dioxaspiro[5.5]undecane, 2,2,6,6-tetramethylpiperidine-4-spiro-2'-(1',3'-dioxane)-5'-spiro-5''-(1'',3''-dioxane)-2''-spiro-4'''-(2''',2'''-6'',6'''-tetramethylpiperidine).

If any substituents are $C_2-C_6$ alkoxyalkyl, they are for example methoxymethyl, ethoxymethyl, propoxymethyl, tert-butoxyethyl, ethoxyethyl, ethoxypropyl, n-butoxyethyl, tert-butoxyethyl, isopropoxyethyl or propoxypropyl.

If $R_7$ is $C_3-C_5$ alkenyl, it is for example 1-propenyl, allyl, methallyl, 2-butenyl or 2-pentenyl.

As $C_7-C_9$ aralkyl, $R_7$ is in particular phenethyl or above all benzyl; and as $C_5-C_7$ cycloalkyl, $R_7$ is especially cyclohexyl.

If $R_7$ is $C_2-C_4$ hydroxyalkyl, it is for example 2-hydroxyethyl, 2-hydroxypropyl, 3-hydroxypropyl, 2-hydroxybutyl or 4-hydroxybutyl.

As $C_6-C_{10}$ aryl, $R_7$ is in particular phenyl, or alpha- or $\beta$-naphthyl which is unsubstituted or substituted by halogen or $C_1-C_4$ alkyl.

If $R_7$ is $C_2-C_{12}$ alkylene, it is for example ethylene, propylene 2,2-dimethylpropylene, tetramethylene, hexamethylene, octamethylene, decamethylene or dodecamethylene.

If $R_7$ is $C_6-C_{12}$ arylene, it is for example o-, m- or p-phenylene, 1,4-naphthylene or 4,4'-diphenylene.

If Z' is $C_2-C_{12}$ alkanoyl, it is for example propionyl, butyryl, octanoyl, dodecanoyl or preferably acetyl.

The following compounds are examples of polyalkylpiperidine starting materials useful in making hydroxylamine derivatives of formula D.

3-benzyl-1,3,8-triaza-7,7,9,9-tetramethylspiro[4.5]-decane-2,4-dione, 3-n-octyl-1,3,8-triaza-7,7,9,9-tetramethylspiro[4.5]-decane-2,4-dione, 3-allyl-1,3,8-triaza-1,7,7,9,9-pentamethylspiro[4.5]-decane-2,4-dione, or the compounds of the following formulae:

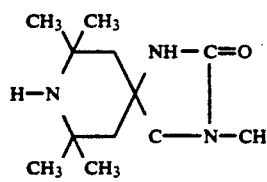 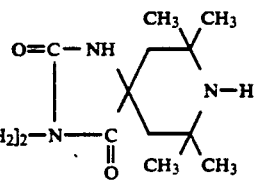

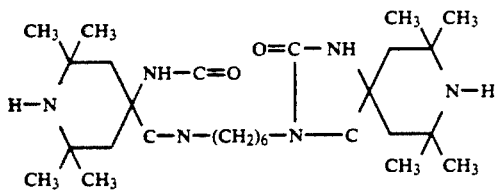

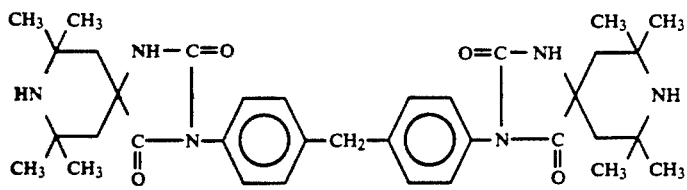

As $C_5$-$C_7$ cycloalkyl, $R_8$ is in particular cyclohexyl.

As $C_6$-$C_{10}$ aryl, $R_8$ is particularly phenyl, or alpha- or β-naphthyl which is unsubstituted or substituted with halogen or $C_1$-$C_4$ alkyl.

As $C_1$-$C_3$ alkylene, E is for example methylene, ethylene or propylene.

As $C_2$-$C_6$ alkylene, G is for example ethylene, propylene, 2,2-dimethylpropylene, tetramethylene or hexamethylene; and as $C_6$-$C_{12}$ arylene, G is o-, m- or p-phenylene, 1,4-naphthylene or 4,4'-diphenylene.

The following compounds are examples of polyalkylpiperidine starting materials useful in making the hydroxylamine derivatives of formula E.

N-hydroxymethyl-N'-2,2,6,6-tetramethylpiperidin-4-yl-urea,

N-methoxymethyl-N'-2,2,6,6-tetramethylpiperidin-4-yl urea,

N-methoxymethyl-N'-n-dodecyl-N'-2,2,6,6-tetramethylpiperidin-4-yl-urea, and

O-(2,2,6,6-tetramethylpiperidin-4-yl)-N-methoxymethylurethane.

When the instant hydroxylamine derivative is of formula F, the following polymeric compounds are examples of starting materials useful in preparing said derivatives.

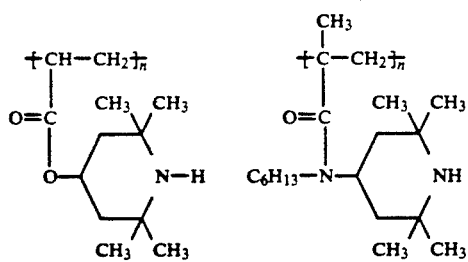

Additional starting hindered amine derivatives include for formula J:

poly-{[6-[(1,1,3,3-tetramethylbutyl)-imino]-1,3,5-triazine-2,4-diyl][2-(1-oxyl-2,2,6,6-tetramethyl piperidyl)-imino]-hexamethylene-4[4-(1-oxyl-2,2,6,6-tetramethylpiperidyl]-imino]}, For compounds of formula O, $R_3$ is preferably $C_1$-$C_{12}$ alkyl and $C_5$-$C_7$ cycloalkyl and more preferably methyl, octyl, dodecyl and cyclohexyl.

For compounds of formula P, the following species are typical of tetracarboxylic acid dianhydrides suitable for the preparation thereof 2,3,9,10-perylene tetracarboxylic acid dianhydride
1,4,5,8-naphthalene tetracarboxylic acid dianhydride
2,6-dichloronaphthalene-1,4,5,8-tetracarboxylic acid dianhydride
2,7-dichloronaphthalene-1,4,5,8-tetracarboxylic acid dianhydride
2,3,6,7-tetrachloronaphthalene-1,4,5,8-tetracarboxylic acid dianhydride
phenanthrene-1,8,9,10-tetracarboxylic acid dianhydride
2,3,3',4'-benzophenonetetracarboxylic acid dianhydride
pyromellitic dianhydride
3,3',4,4'-benzophenonetetracarboxylic acid dianhydride
2,2',3,3'-benzophenonetetracarboxylic acid dianhydride
3,3',4,4'-biphenyltetracarboxylic acid dianhydride
2,2',3,3'-biphenyltetracarboxylic acid dianhydride
4,4'-isopropylidenediphthalic anhydride
3,3'-isopropylidenediphthalic anhydride
4,4'-oxydiphthalic anhydride
4,4'-sulfonyldiphthalic anhydride
3,3'-oxydiphthalic anhydride
4,4'-methylenediphthalic anhydride
4,4'-thiodiphthalic anhydride
4,4'-ethylidenediphthalic anhydride
2,3,6,7-naphthalenetetracarboxylic acid dianhydride
1,2,4,5-naphthalenetetracarboxylic acid dianhydride
1,2,5,6-naphthalenetetracarboxylic acid dianhydride
benzene-1,2,3,4-tetracarboxylic acid dianhydride
pyrazine-2,3,5,6-tetracarboxylic acid dianhydride The following compounds are examples of hydroxylamines derivatives applicable for use in the invention:

1. di-(1-acetoxy-2,2,6,6-tetramethylpiperidin-4-yl)-phthalate
2. di-(1-acetoxy-2,2,6,6-tetramethylpiperidin-4-yl)-isophthalate
3. di-(1-acetoxy-2,2,6,6-tetramethylpiperidin-4-yl) sebacate
4. di-(1-acetoxy-2,2,6,6-tetramethylpiperidin-4-yl) succinate
5. di-(1-acetoxy-2,2,6,6-tetramethylpiperidin-4-yl) adipate
6. di-(1-acetoxy-2,2,6,6-tetramethylpiperidin-4-yl) n-butylmalonate
7. di-(1-acetoxy-2,2,6,6-tetramethylpiperidin-4-yl) 2,2-diethylmalonate
8. poly- [6-[(1,1,3,3-tetramethylbutyl)-imino]-1,3,5-triazine-2,4-diyl][2-(1-acetoxy-2,2,6,6-tetramethylpiperidyl)-imino]-hexamethylene-[4-(1-acetoxy-2,2,6,6-tetramethylpiperidyl)-imino]
9. 1,4-diacetoxy-2,2,6,6-tetramethylpiperidine
10. 1-acetoxy-4-hydroxy-2,2,6,6-tetramethylpiperidine
11. di-(1-propionoxy-2,2,6,6-tetramethylpiperidine-4-yl)adipate 12. di-(1-benzoyloxy-2,2,6,6-tetramethylpiperidine-4-yl)oxalate
13. (1-acetoxy-2,2,6,6-tetramethylpiperidin-4-yl)-4-hydroxy-3,5-di-tert.butylbenzoate
14. 2-(4-hydroxy-3,5-di-tert.butylbenzyl)-2-(1-acetoxy-2,2,6,6-tetramethylpiperidin-4-yl) n-butylmalonate
15. N-(1-acetoxy-2,2,6,6-tetramethylpiperidin-4-yl)-N-(n-butyl)-4-(4-hydroxy-3,5-di-tert.butylbenzoyl-oxy)-3,5-di-tert.butylbenzamide
16. 1,6-di-(N-acetyl-N-(1-acetoxy-2,2,6,6-tetramethyl-piperidin-4-yl)]aminohexane
17. di-(1-acetoxy-2,2,6,6-tetramethylpiperidin-4-yloxy)-hexane-1,6-dicarbamate
18. 1 acetoxy-4-(N-acetyl-N-n-dodecylamino)-2,2,6,6-tetramethylpiperidine
19. di-(1-propionoxy-2,2,6,6-tetramethylpiperidin-4-yl) succinate
20. di-(4-n-octadecanoyloxy-2,2,6,6-tetramethylpiperazin-1-yl)oxalate
21. 1,4-di-(2-ethylhexanoyloxy)-2,2,6,6-tetramethyl-piperidine
22. di-(1-benzoyloxy-2,2,6,6-tetramethylpiperidin-4-yl) sebacate
23. 1-benzoyloxy-4-(N-n-butyl-N-benzoylamino)-2,2,6,6-tetramethylpiperidine
24. 1-(1-benzoyloxy-2,2,6,6-tetramethylpiperdin-4-yl)-azepin-2-one
[1-benzoyloxy-1'-benzyloxy-di-(2,2,6,6-tetramethyl-piperidin-4-yl)]isophthalate
26. 1,4-di-(4-hydroxy-3,5-di-tert-butylbenzoyloxy)-2,2,6,6-tetramethylpiperidine
27. n-butyl-(1-benzoyloxy-2,2,6,6-tetramethylpiperidin-4-yl)carbonate
28. 1-carbamoyloxy-4-benzoyloxy-2,2,6,6-tetramethyl-piperidine
29. di(1 carbamoyloxy-2,2,6,6-tetramethylpiperidin-4-yl)sebacate
30. di-(1-n-butylcarbamoyloxy-2,2,6,6-tetramethyl-piperidin-4-yl)2,2-diethylmalonate
31. di-(4-benzoyloxy-2,2,6,6-tetramethylpiperidin-1-yl)-2,4,4-trimethylhexane-1,6-dicarbamate
32. alpha,alpha'-(di-1-ethoxy-2,2,6,6-tetramethylpiperi-din-4-yloxy)-p-xylene
33. 4-benzyloxy-1-ethoxy-2,2,6,6-tetramethylpiperidine
34. 1,4-dibenzyloxy-2,2,6,6-tetramethylpiperidine
35. alpha,alpha'-(di-1-benzyloxy-2,2,6,6-tetramethyl-piperidin-4-yloxy)-p-xylene
36. di-(1-benzyloxy-2,2,6,6-tetramethylpiperidin-4-yl)sebacate
37. 4-benzoyloxy-1-(alpha-methylbenzyloxy)-2,2,6,6-tetramethylpiperidine
38. di-[1-(alpha-methylbenzyloxy)-2,2,6,6-tetramethyl-piperidin-4-yl]sebacate
39. 1,4-dimethoxy-2,2,6,6-tetramethylpiperidine
40. 4-benzoyloxy-1-methoxy-2,2,6,6-tetramethylpiperidine
41. di-(1-methoxy-2,2,6,6-tetramethylpiperidin-4-yl) sebacate
42. di-(1-methoxy-2,2,6,6-tetramethylpiperidin-4-yl)succinate
43. (1-cyclohexyloxy-2,2,6,6-tetramethylpiperidin-4-yl)-3,5-di-t.butyl-4-hydroxybenzoate
44. 1-cyclohexyloxy-4-octadecanoyloxy-2,2,6,6-tetramethylpiperidine
45. di-(1-methoxy-2,2,6,6-tetramethylpiperidin-4-yl)isophthalate
46. di-(1 cyclohexyloxy-2,2,6,6-tetramethylpiperidin-4yl)sebacate
47. di-(1-cyclohexyloxy-2,2,6,6-tetramethylpiperidin-4yl)isophthalate
48. di-(1-heptyloxy-2,2,6,6-tetramethylpiperidin-4-yl)sebacate
49. di-1-(alpha-methylbenzyloxy)-2,2,6,6-tetramethyl-piperidin-4-yl]terephthalate
50. di-(1-ethoxy-2,2,6,6-tetramethylpiperidin-4-yl)sebacate
51. di-(1 cumyloxy-2,2,6,6-tetramethylpiperidin-4-yl)sebacate
52. 3,15-di-alpha-methylbenzyloxy-2,2,4,4,14,14,16,16-octamethyl-7,11,18,21-tetraoxa-3,15-diazatris-piro[5.2.2.5.2.2]heneicosane
53. 3,15-dicyclohexyloxy-2,2,4,4,14,14,16,16-octame-thyl7,11,18,21-tetraoxa-3,15-diazatrispiro[5.2.2.5.2.2]-heneicosane
54. di-(1-cyclohexyloxy-2,2,6,6-tetramethylpiperidin-4-yl) succinate
55. di-[1-(alpha-methylbenzyloxy)-2,2,6,6-tetramethyl-piperidin-4-yl]succinate
56. di-(1-nonyloxy-2,2,6,6-tetramethylpiperidin-4-yl)sebacate
57. di-(1-octadecyloxy-2,2,6,6-tetramethylpiperidin-4-yl) sebacate
58. di-(1-nonyloxy-2,2,6,6-tetramethylpiperidin-4-yl)succinate
59. di-[1-(1-methylcyclohexyloxy)-2,2,6,6-tetramethyl-piperidin-4-yl]sebacate
60. di-[1-(3-cyclohexen-1-yloxy)-2,2,6,6-tetramethyl-piperidin-4-yl]sebacate
61. di-(1-tert.butoxy-2,2,6,6-tetramethylpiperidin-4-yl) sebacate
62. di-(1-carbamoyloxy-2,2,6,6-tetramethylpiperidin-4-yl) n-butylmalonate
63. di-[1-(bicyclo-[4.4.0]-decyl-1-oxy)-2,2,6,6-tetrame-thylpiperidin-4-yl]sebacate
64. di-(1-n-butylcarbamoyloxy-2,2,6,6-tetramethyl-piperidin-4-yl)phthalate
65. di-(1-n-butylcarbamoyloxy-2,2,6,6-tetramethyl-piperidin-4-yl)n-butylmalonate
56. di-(1-phenylcarbamoyloxy-2,2,6,6-tetramethyl-piperidin-4-yl)sebacate
67. 4-benzoyloxy-1-benzyloxy-2,2,6,6-tetramethyl-piperidine
68. di-(1-methoxy-2,2,6,6-tetramethylpiperidin-4-yl)(3,5-di-tert.butyl-4-hydroxybenzyl) n-butylmalonate
69. 8-alpha-methylbenzyloxy-7,7,9,9-tetramethyl-8-aza-1,4-dioxaspiro[4.5]decane
70. di-(1-cyclohexyloxy-2,2,6,6-tetramethylpiperidin-4-yl)(3,5-di-tert.butyl-4-hydroxybenzyl) n-butylmalonate
71. di-(1-octyloxy-2,2,6,6-tetramethylpiperidin-4-yl) sebacate
72. di-(1-octyloxy-2,2,6,6-tetramethylpiperidin-4-yl) succinate
73. bis[N-(1-cyclohexyloxy-2,2,6,6-tetramethyl-piperidin4-yl)-n-butylamino]sebacamide
74. bis(1-cyclooctyloxy-2,2,6,6-tetramethylpiperidin-4-yl) sebacate
75. N,N',N'',N'''-tetrakis[2,4-bis[N-(1-cyclohexyloxy-2,2,6,6-tetramethylpiperidin-4-yl)-n-butylamino]-1,3 -3,3'-ethylenediiminodipropylamine
76. 2,4-bis[N-(1-cyclohexyloxy-2,2,6,6-tetramethyl-piperidin-4-yl)-n-butylamino]-6-t-octylamino-1,3,5-triazine
77. 2,4-bis[N-(1-cyclohexyloxy-2,2,6,6-tetramethyl-piperidin-4-yl)-6-morpholino-1,3,5-triazine 78. N,N'-bis(1-cyclohexyloxy-2,2,6,6-tetramethylpiperidine-4-yl)-N,N'-bis{2,4-bis[N-(1-cyclohexyloxy-2,2,6,6'-tetramethyl-piperidin-4-yl)n-butylamino]-1,3,5-triazin-6-y]hexamethylenedia 79. N,N'-bis[2,4-bis[N-(1-cyclohexyloxy-2,2,6,6-tetramethyl-piperidin-4-yl)-n-butylamino]-1,3,5-triazine-6-yl}piperazine 80. N-(1 cyclohexyloxy-2,2,6,6-tetramethylpiperidin-4-yl) succinimide 81. 2,4,6-tris[N-(1-cyclohexyloxy-2,2,6,6-tetramethyl-piperidin-4-yl)-n-butylamino]-1,3,5-triazine 82. 2,4,6-tris[N-(1-methoxy-2,2,6,6-tetramethylpiperidin-4-yl)-n-butylamino]-1,3,5-triazine 83. N,N',N'',N'''-tetrakis{2,4-bis[N-(1-octyloxy-2,2,6,6-tetramethylpiperidin-4-yl)-n-butylamino]-1,3,5-triazin-6-yl}-3,3'-ethylenediiminodipropylamine The hydroxylamine derivatives of the instant invention are generally prepared by oxidizing the corresponding hindered amine with an appropriate peroxy compound such as hydrogen peroxide or tert-butyl hydroperoxide in the presence of a metal carbonyl or metal oxide catalyst followed by reduction of the oxyl intermediate formed to the desired N-hydroxy derivative, preferably by catalytic hydrogenation. Thereafter, the N-acyloxy derivatives are prepared by reacting the N-hydroxy hindered amine with the appropriate acid chloride, anhydride, isocyanate or substituted chloroformate. The catalytic hydrogenation can also be conducted in acetic anhydride to prepare the N-acetoxy derivative.

O-alkyl substituted N-hydroxy derivatives can be synthesized by several routes The N-hydroxy derivative can be alkylated with sodium hydride and halogenated hydrocarbons such as benzyl bromide and ethyl iodide. N-methoxy variants can be prepared by thermolysis of a chlorobenzene solution of nitroxyl radical and di-tert-butyl peroxide. The product is formed by a coupling reaction between the nitroxyl radical and methyl radical generated from $\beta$-scission of a t-butoxy radical. Other N-alkoxy variants are synthesized by coupling nitroxyl radicals with hydrocarbon radicals generated from thermal decomposition of di-tert-butyl peroxide in the presence of hydrocarbon solvents such as cyclohexane, toluene, and ethylbenzene.

A preferred approach is the preparation of N-alkoxy hindered amines directly from hindered amines. For example, a mixture of 4-benzoyloxy-2,2,6,6-tetramethylpiperidine, aqueous t-butyl hydroperoxide, molybdenum oxide, and ethylbenzene gives a 90% yield of N-alpha-methylbenzyloxy HALS.

The oxalates of formula N can be prepared by reacting (1-hydroxy-2,2,6,6-tetramethylpiperidin-4-yl)stearate, benzoate, and the like, with oxalylchloride, or for $G_1$ being —NH—G'-NH by reacting the appropriate 1-hydroxy2,2,6,6-tetramethylpiperidine with the appropriate diisocyanate.

The hindered amine precursors are large commercially available or can be prepared by known methods.

The polyolefins of the instant compositions are homopolymers or copolymers of an alpha-olefin.

The saturated polyolefins useful in the instant compositions are the polymers derived from monoolefins, such as polyethylene, which can be crosslinked, polypropylene, polyisobutylene, polybutene-1, poly-3-methylbutene-1 and poly-4-methylpentene-1. Polyethylene may be for example medium density, high density or linear low density polyethylene.

Mixtures of the homopolymers cited above, for example mixtures of polypropylene and polyethylene, polypropylene and polybutene-1-, or polypropylene and polyisobutylene and the like, may also be used.

Copolymers of monolefins may also be used in the instant compositions, for example ethylene/propylene copolymers, propylene-butene-1 copolymers, propylene/octene-1 copolymers, ethylene/butene-1 copolymers, ethylene/octene-1 copolymers as well as ethylene/vinyl acetate copolymers.

The instant compositions particularly employ as the polyolefin component polyethylene, polypropylene, polyisobutylene, poly(butene-1), poly(pentene-1), poly(3-methylbutene-1), poly(4-methylpentene-1) and various ethylene and propylene copolymers.

Especially preferred polyolefin substrates are polypropylene, low density polyethylene, medium density polyethylene, high density polyethylene, linear low density polyethylene, poly(butene-1), ethylene/vinyl acetate copolymer, ethylene/propylene copolymer and copolymers of ethylene or of propylene with higher alpha olefins.

The most preferred polyolefin substrate polypropylene, high density polyethylene, ethylene/propylene copolymer or a copolymer of ethylene or of propylene with another alpha olefin.

In general, the compounds of the present invention are employed in from about 0.01 to about 5% by weight of the stabilized polyolefin composition, although this will vary with the particular substrate and application. An advantageous range is from about 0.05 to about 2%, and especially 0.1 to about 1%.

The stabilizers of the instant invention may readily be incorporated into the polyolefins by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polymer compositions of the invention may optionally also contain various conventional additives, such as the following.

1. Antioxidants 1.1. Alkylated monophenols, for example, 2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert.butyl-4-methoxymethylphenol 1.2. Alkylated hydroquinones, for example, 2,6-di-tert.butyl-4-methoxyphenol
2,5-di-tert.butyl-hydroquinone
2,5-di-tert.amyl-hydroquinone
2,6-diphenyl-4-octadecyloxyphenol 1.3. Hydroxylated thiodiphenyl ethers, for example 2,2'-thio-bis-(6-tert.butyl-4-methylphenol)
2,2'-thio-bis-(4-octylphenol)
4,4'-thio-bis-(6-tert.butyl-3-methylphenol)

4,4'-thio-bis-(6-tert.butyl-2-methylphenol)

1.4. Alkylidene-bisphenols, for example, 2,2'-methylene-bis-(6-tert.butyl-4-methylphenol)
2,2'-methylene-bis-(6-tert.butyl-4-ethylphenol)
2,2'-methylene-bis-[4-methyl-6(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethyleneglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.-butyl-4-methylphenyl]-terephthalate.

1.5. Benzyl compounds, for example, 1,3,5-tri-(3,5-di-tert.butyl-4-hydroxybenzyl)-2,4,6-trimethylbenzene-di-(3,5-di-tert.butyl-butyl-4-hydroxybenzyl)-sulfide
3,5-di-tert.butyl-4-hydroxybenzyl-mercapto-acetic acid isooctyl ester
bis-(4-tert.burtyl-3-hydroxy-2,6-dimethylbenzyl)dithiolterephthalate
1,3,5-tris-(3,5-di-tert.butyl-4-hydroxybenzyl)-isocyanurate
1,3,5-tris-(4-tert.butyl-3-hydroxy-2,6-dimethylbenzyl)-isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt

1.6. Acylaminophenols, for example, 4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbamate

1.7. Esters of β-(3,5-di-tert-butyl-4-hydroxyphenyl)-propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β-(5-tert-butyl-4-hydroxy-3-methylphenyl)- propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.9. Amides of β-(3,5-di-tert.butyl-4-hydroxyphenyl)-propionic acid for example, N,N'-di-(3,5-di-tert.butyl-4-hydroxyphenylpropionyl)-hexamethylenediamine
N,N'-di-(3,5-di-tert.butyl-4-hydroxyphenylpropionyl)-trimethylenediamine
N,N'-di-(3,5-di-tert.butyl-4-hydroxyphenylpropionyl)-hydrazine

2. UV absorbers and light stabilizers 2.1. 2-(2'-Hydroxyphenyl)-benzotriazoles, for example, the 5'-methyl-, 3',5'-di-tert.butyl-, 5'-tert.butyl-, 5'-(1,1,3,3-tetramethylbutyl)-, 5-chloro-3',5'-di-tert.-butyl-, 5-chloro-3'-tert.butyl-5'-methyl-, 3'-sec.butyl-5'-tert.butyl-, 4'-octoxy, 3',5'-di-tert.amyl-, 3',5'-bis-(α, α-dimethylbenzyl)-derivative.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivative.

2.3. Esters of optionally substituted benzoic acids for example, phenyl salicylate, 4-tert.butyl-phenylsalicylate, octylphenyl salicylate, dibenzoylresorcinol, bis-(4-tert.-butylbenzoyl)-resorcinol, benzoylresorcinol, 3,5-di-tert.-butyl-4-hydroxybenzoic acid 2,4-di-tert.butylphenyl ester and 3,5-di-tert.-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxycinnamic acid methyl ester, N-(β-carbomethoxy-β-cyanovinyl)-2-methyl-indoline.

2.5 Nickel compounds, for example, nickel complexes of 2,2'-thio-bis-[4-(1,1,3,3-tetramethylbutyl)-phenol], such as the 1:1 or 1:2 complex, optionally with additionally ligands such as n-butylamine, triethanolamine or N-cyclohexyl-di-ethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate bis-(1,2,2,6,6-pentamethylpiperidyl)-sebacate n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-

(2,2,6,6-tetramethylpiperidyl)-hexamethylendiamine and 4-tert.octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3, 2.7. Oxalic acid diamides, for example, 4,4'-dioctyloxyoxanilide, 2,2'-di-octyloxy-5,5'-di-tert.butyloxan 2,2'-di-dodecyloxy-5,5'-di-tert.butyl-oxanilide, 2-ethoxy2'-ethyl-oxanilide, N,N'-bis (3-dimethylamin oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

2.8. Hydroxyphenyl-s-triazines, for example 2,6-bis-(2.4-dimethylphenyl)-4-(2-hydroxy-4-octyloxyphenyl)-s-triazine; 2,4-bis(2,4-dihydroxyphenyl)-6-(4-chlorophenyl)-s-triazine; 2,4-bis[2-hydroxy-4-(2-hydroxy ethoxy)phenyl]-6-(4-chlorophenyl)-s-triazine; 2,4-bis[2-hydroxy-4-(2-hydroxy-4-(2-hydroxy ethoxy)phenyl]-6-(24-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chorophenyl)-s -triazine,2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.-butylphenyl) pentaerythritol diphosphite, tristearylsorbitol triphosphite, tetrakis-(2,4-di-tert.butylphenyl)-4,4'-diphenylylenediphosphonite.

5. Compounds which destroy peroxide, for example, esters o β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyldisulfide, pentaerythritol-tetrakis-(β-dodecylmercapto)-propionate.

6. Polyamide stabilizers, for example copper salts in combination with iodides and/or phosphorus compounds and salts of divalent manganese.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Hydroxylamine co-stabilizers, for example, dibenzyl hydroxylamine, dioctyl hydroxylamine, didodecyl hydroxylamine and dioctadecyl hydroxylamine.

9. Nucleating agents, for example, 4-tert.butyl-benzoic acid, adipic acid, diphenylacetic acid.

10. Fillers and reinforcing agents, for example, calcium carbonate, silicates, glass fibers, asbestos, talc, kaolin, mica, barium sulfate, metal oxides and hydroxides, carbon black, graphite.

11. Other additives, for example, plasticizers, lubricants, emulsifiers, pigments, optical brighteners, flameproofing agents, anti-static agents, blowing agents and thiosynergists such as dilaurylthiodipropionate or distearylthiodipropionate or zinc dibutyldithiocarbamate.

Of particular value in the instant compositions are the benzotriazoles of high molecular weight and low volatility such as 2-[2-hydroxy-3,5-di(alpha,alpha-di-methylbenzyl)-phenyl]-2H-benzotriazole, 2-(2-hydroxy-3,5-di-tert-octylphenyl)-2H-benzotriazole, 2-(2-hydroxy-3-alpha,alpha-dimethylbenzyl-5-tert-octyl-phenyl)-2H-benzo-triazole, 2-(2-hydroxy-3-tert-octyl-5-alpha,alpha-dimethylbenzylphenyl)-2H-benzotriazole, 2-(2-hydroxy-3,5-di-tert-amylphenyl)-2H-benzotriazole, 2-[2-hydroxy-3-tert-butyl-5-(2-(omega-hydroxy-octa-(ethyleneoxy)carbonyl)-ethylphenyl]-2H-benzotriazole, dodecylated 2-(2-hydroxy-5-methylphenyl)-2H-benzotriazole and the 5-chloro compounds corresponding to each of the above named benzotriazoles.

Most preferably the benzotriazoles useful in the instant compositions are 2-[2-hydroxy-3,5-di(alpha,alpha-dimethyl-benzyl)phenyl]-2H-benzotriazole and 2-[2-hydroxy-3-tert-butyl-5-(2-(omega-hydroxy-octa-(ethyleneoxy)carbonyl)-ethylphenyl]-2H-benzotriazole.

Of further value are blends of the instant hindered amines with the co-stabilizers identified as (7) and (8) as well as the nitrone equivalents of (8) Such combinations are more resistant to color formation than phenolic-based formulations and are thus particularly useful in applications where color development is of particular concern, e.g. polypropylene fibers, polyolefins subjected to gamma irradiations, injection molded systems, and the like correspondingly, the instant hindered amines are particularly effective in polyolefin applications requiring thiosynergists as noted in (11) above.

The applicable flame retardants exhibit a broad range of chemistries. Typical flame retardants include phosphate esters, halogenated phosphate esters, chlorinated hydrocarbons, brominated hydrocarbons, antimony-based compounds, borates, polyols containing phosphorus, other metal-containing systems such as aluminum and molybdenum, and the like.

Representative commercial flame retardants include:
ENDURA products from PPG Industries, KLOROCHECK and PYROCHECK products from Ferro, ANTIBLAZE products from Albright & Wilson, THERMOLIN products from Olin Corporation, and the like.

Typical pesticides include carbamates such as 3-iodo-2-propynyl-butylcarbamate, dimethyldithiocarbamate, dimethyldithiocarbamate, 2-sec.butyl-phenyl-N-methylcarbamate, benzimidazol carbamates, carbamyl-(1-naphthylN-methylcarbamate), dithio carbaminate, (2-isopropoxyphenyl)-N-methylcarbamate, 4-(dimethylamino)-n-tolyl methylcarbamate, 6-chloro-3,4-xylyl methylcarbamate, zinc dimethyldithio carbamate and 1-naphthyl methylcarbamate; arsenic compounds such as copper chrome arsenate; chlorinated phenols such as tetrachlorophenol, pentachlorophenol, sodium pentachlorophenate; copper compounds such as copper naphthenate; other chlorinated compounds such as 1-chloronaphthalene, N-trichloromethyl-thiophthalimide, tetrachloroisophthalonitrile, tetrachloropyridine4methyl-sulfonate, 2,4-dichloro-6-(o-chloroanilino)-s-triazine, 2,3-dichloro-1,4-naphthoquinone, alpha,alpha-bis(p-chlorophenyl)-3-pyridinemethanol and pentachloronitrobenzene; organo mercury compounds such as phenyl mercuric oleate and di(phenyl mercury) dodecenyl succinate; organo tin compounds such as tributyl tin oxide; zinc compounds such as zinc naphthenate; ketones such as 2-n-octyl-4- isothiazolin-3-one, and 3,3'-ethylene bis [tetrahydro-4,6-dimethyl-2H-1,3,5-thiadiazine-2-thione]; sulfonyl compounds such as 1,2-bis(N-propylsulfonyl)ethane; and iodomethyl p-tolyl sultone azole compounds such as 2-(4-thiazolyl)benzimidazole and $(Zn)_2$ mercapto benzothiazole; and other fungicides. Of particular interest are halogenated and sulfur-containing pesticides.

Reference can be made to the Farm Chemicals Handbook for a more detailed indication of representative pesticides, generally insecticides and fungicides.

The following examples further illustrate the embodiments of the instant invention. All parts given are by weight unless otherwise noted.

EXAMPLE 1

Light Stabilization of Polypropylene

Polypropylene powder (Hercules Profax 6501) stabilized with 0.2% octadecyl 3,5-di-tert.butyl-4-hydroxy hydrocinnamate antioxidant is thoroughly blended with 0.1% of additive. The blended materials are then milled on a two-roll mill at 182° C. for 5 minutes, after which time the stabilized polypropylene is sheeted from the mill and allowed to cool. The milled polypropylene is then cut into pieces and compression molded on a hydraulic press at 250° C. and 175 psi ($1.2 \times 10^6$ Pa) into 5 mil (0.127 mm) films. The sample is exposed in a fluorescent sunlight/black light chamber until failure. Failure is taken as the hours required to reach 0.5 carbonyl absorbance by infrared spectroscopy on the exposed films.

| Compound # | Hours to Failure |
|---|---|
| Control | 340 |
| 22* (similar phthalate) | 980 |
| 30 | 890 |
| 33 | 990 |
| 36 | 1110 |
| 47 | 1750 |
| 48 | 750 |
| 49* (similar isophthalate) | 850 |
| 63 | 800 |
| 64 | 930 |
| 64* (similar isophthalate) | 790 |
| Control | 300 |
| 36 | 1360 |
| 37 | 1250 |
| 42 | 1490 |
| 43 | 1750 |
| 44 | 1430 |
| 46 | 1020 |
| Control | 470 |
| 8* (similar 1-cyclohexyl compound) | 860 |
| 49 | 2000 |
| 50 | 1160 |
| 51 | 1100 |
| 52 | 1550 |
| 53 | 1860 |
| 54 | 850 |
| Control | 370 |
| 34 | 1710 |
| 43 | 1200 |
| 47* (similar phthalate) | 1170 |
| 57 | 990 |
| 68 | 1190 |
| 68* (similar 1-cyclohexyloxy compound) | 1050 |

These data thus illustrate the effective light stabilization activity of the compounds in polypropylene.

EXAMPLE 2

Antioxidant Activity

| Base Formulation | |
|---|---|
| Polypropylene* | 100 parts |
| Calcium Stearate | 0.1 parts |
| Antioxidant A | 0.05 parts |

*Profax 6301 from Himont U.S.A.
Antioxidant A - A 1:1 blend of tris(2,4-di-tert.butyl-phenyl) phosphite and tetrakis[methylene 3-(3',5'-di-tert.-butyl-4'-hydroxyphenylpropionate]methane The general processing procedure of Example 1 is repeated utilizing 0.05%, by weight, of stabilizer of the instant invention and preparing 2 mil polypropylene stretched tape. The oxidation stability is then determined in a forced draft oven maintained at 115° C. The stretched tapes are considered to have failed on showing the first signs of embrittlement.

| Additive | Hours to Embrittlement |
|---|---|
| — | 560 |
| B | 570 |
| 41 | 630 |
| 46 | 1250 |
| 57 | 1020 |
| C | 550 |
| 53 | 1020 |
| D | 510 |
| 54 | 630 |

B - di-(2,2,6,6-tetramethylpiperidin-4-yl)sebacate
C - 2,2,4,4,14,14,16,16-octamethyl-7,11,18,21-tetraoxa-3,5-diazatrispiro[5.2.2.5.2.2]-heneicosane
D - di-(2,2,6,6-tetramethylpiperidin-4-yl)succinate These data thus indicate the benefits stemming from the substituent pattern of the instant compounds.

EXAMPLE 3

Light Stability in Flame Retardant Polypropylene

| Base Formulation | |
|---|---|
| Flame Retardant-containing Polypropylene* | 100 parts |
| Calcium Stearate | 0.1 parts |
| Antioxidant A | 0.05 parts |

*X27133-51-1 (from Hercules Corp.) containing 7 phr FRP 205-5 (from PPG), the latter being a brominated $Sb_2O_3$-containing flame retardant.

The indicated amount of each stabilizer is solvent blended into the base formulation and extruded (one extrusion) at 260° C. and pelletized. The pellets are then compression molded pursuant to the conditions described in Example 1 to form 5 mil film samples. The samples are then exposed in a Xenon Arc Weatherometer under dry conditions until failure as evidenced by a showing of the first signs of embrittlement.

| Additive | Conc. (% by wt.) | Hours to Embrittlement |
|---|---|---|
| Test Series I | | |
| — | — | 124 |
| B | 0.05 | 124 |
| B | 0.10 | 124 |
| D | 0.05 | 124 |
| D | 0.10 | 124 |
| 46 | 0.05 | 365 |
| 46 | 0.10 | 408 |
| 54 | 0.05 | 365 |
| 54 | 0.10 | 408 |

| Additive | Conc. (% by wt.) | Hours to Embrittlement |
|---|---|---|
| Test Series II (first extrusion at 232° C. and second extrusion at 260° C.) | | |
| — | — | 122 |
| B | 0.05 | 122 |
| B | 0.10 | 122 |
| 42 | 0.05 | 280 |
| 42 | 0.10 | 372 |
| 54 | 0.05 | 325 |
| 54 | 0.10 | 426 |
| 72 | 0.05 | 220 |
| 72 | 0.10 | 426 |

It is thus seen that, under these processing conditions, the instant compounds significantly increase the lifetime of flame retardant grade polypropylene under accelerated light exposure testing Hence, they are active as light stabilizers in this polymer and are either free of or substantially less affected by antagonistic interactions with the flame retardant additive or its by-products.

EXAMPLE 4

Resistance to Gas Fading of Polypropylene Fibers

| Base Formulation | |
|---|---|
| Polypropylene* | 100 parts |
| Calcium Stearate | 0.1 parts |
| Antioxidant A | 0.2 parts |

*Profax 6301 from Himont U.S.A.

Stabilizers are solvent blended into the polypropylene and extruded (one extrusion) and pelletized. The change in Yellowness Index is determined on the extruded pellets before exposure to gas fading at 60° C. and after two cycles of exposure. Lower numbers indicate less yellowing and less color. The gas fading procedure is carried out in an AATCC gas fume chamber (Drum Model No. 8727) according to the standard procedure at AATCC Test Method 23, "Colorfastness to Burnt Gas Fumes."

| Additive | Conc. (% by wt.) | YI Color |
|---|---|---|
| — | — | 1.2 |
| B | 0.7 | 30.0 |
| 41 | 0.7 | 3.4 |
| 46 | 0.7 | 5.0 |
| 48 | 0.7 | 6.0 |

EXAMPLE 5

Antioxidant Activity in the Presence of Thiosynergists

| Base Formulation | |
|---|---|
| Polypropylene* | 100 parts |
| Calcium Stearate | 0.1 parts |
| Antioxidant E | 0.1 parts |
| Distearylthiodipropionate | 0.3 parts |

*Profax 6501 from Himont
Antioxidant E - tetrakis [methylene 3-(3',5'-di-tert.-butyl-4'-hydroxyphenyl)propionate]methane The indicated amount of each stabilizer is solvent blended into the base formulation with the resulting blend being extruded at 220° C. for compounding, pelletized and then injection molded at 204° C. The injection molded plaques (5 cm. × 5 cm. × 125 mil) are placed in a forced air oven maintained at 150° C. The plaques are considered to have failed on showing the first signs of embrittlement or surface crazing. Yellowness Index is also determined for the initial plaques and for the plaques at failure according to ASTM D1925.

| Additives | Conc. (% by wt.) | Hours to Failure | YI Initial | YI Failure |
|---|---|---|---|---|
| — | — | 2905 | 8.2 | 79 |
| B | 0.15 | 1996 | 13.2 | 70 |
| B | 0.25 | 1913 | 12.5 | 62 |
| D | 0.15 | 2633 | 10.0 | 86 |
| D | 0.25 | 2748 | 9.7 | 93 |
| 71 | 0.15 | 3402 | 10.6 | 98 |
| 71 | 0.25 | 4740 | 11.6 | 118 |
| 72 | 0.15 | 2953 | 10.6 | 81 |
| 72 | 0.25 | 2844 | 11.4 | 83 |

It is seen that during elevated temperature-aging, the instant compounds do not adversely affect the synergistic activity of DSTDP in polypropylene. In fact, in certain cases there is an enhancement of the antioxidant activity. This data thus confirms the availability of the compounds for use in applications involving sulfur-containing compounds.

EXAMPLE 6

Fiber preparation is accomplished by incorporating all additives and flame retardants into fiber grade resin (33 melt flow polypropylene) utilizing a 2.54 cm compounding extruder at 232° C. The resulting pellets are extruded and spun at 241° C. with a residence time of 6.5 minutes. The spun fiber is drawn in-line at a 4:1 ratio yielding a final fiber of 450/30 denier.

Performance evaluations are conducted on knitted fabric produced from the fiber samples. The fabrics containing the instant NOR compounds exhibit good stability as determined by color change and degradation criteria.

EXAMPLE 7

Greenhouse Film Application

All additives are incorporated into low density polyethylene (LDPE) and 150 μ films are blow extruded at 200° C. Typical formulations contain various phenolic co-stabilizers and 0.15% NOR compound. The resulting films are exposed in a greenhouse on pinewood backing, galvanized iron backing, and without backing. Treatment includes application of pesticide on a monthly and six month basis. Performance is measured by monitoring % residual elongation during the exposure period. The films containing the instant NOR compounds exhibit good stability.

What is claimed is:

1. A stabilized composition comprising (a) a polyolefin substrate and (b) an effective stabilizing amount of a substituted hindered amine derivative corresponding to the formulae A-P

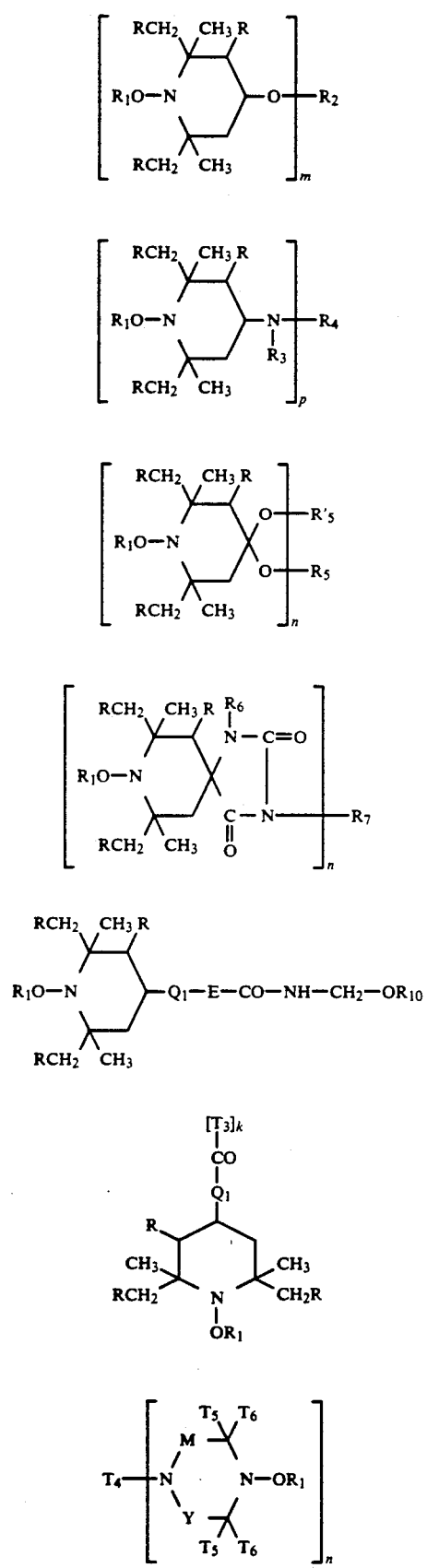

$$\text{(O)} \quad \underset{\underset{H_3C\ CH_2R}{|}}{\overset{\overset{H_3C\ CH_2R\ R}{|}}{R_1O-N}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!$$

(O) — piperidine ring with $H_3C, CH_2R$ substituents, N–OR$_1$, linked to a cyclic imide containing R$_3$.

(P) — analogous bis-structure $[\ldots]_2$ with E$_6$ linker.

wherein

R is hydrogen or methyl,

R$_1$ is independently C$_1$–C$_{18}$ alkyl, C$_2$–C$_{18}$ alkenyl, C$_2$–C$_{18}$ alkynyl, C$_5$–C$_{12}$ cycloalkyl, C$_6$–C$_{10}$ bicycloalkyl, C$_5$–C$_8$ cycloalkenyl, C$_6$–C$_{10}$ aryl, C$_7$–C$_9$ aralkyl, C$_7$–C$_9$ aralkyl substituted by alkyl or aryl, or $$\overset{O}{\underset{}{\overset{\|}{C}}}-D$$

wherein D is C$_1$–C$_{18}$ alkyl, C$_1$–C$_{18}$ alkoxy, phenyl, phenyl substituted by hydroxy, alkyl or alkoxy, or amino or amino mono- or disubstituted by alkyl or phenyl;

m is 1–4, when m is 1,

R$_2$ is hydrogen, C$_1$–C$_{18}$ alkyl optionally interrupted by one or more oxygen atoms, C$_2$–C$_{12}$ alkenyl, C$_6$–C$_{10}$ aryl, C$_7$–C$_{18}$ aralkyl, glycidyl, a monovalent acyl radical of an aliphatic, cycloaliphatic, araliphatic or aromatic carboxylic acid, or of a carbamic acid structure: HO–[di-tert-butylphenyl]–C(=O)–O–[di-tert-butylphenyl]–C(=O)–$]_x$ wherein x is 0 or 1, or structure: $(CH_2)_y$–N–[tetramethylpiperidine]–N–CH$_2$–C(=O)– wherein y is 2–4;

when m is 2,

R$_2$ is C$_1$–C$_{12}$ alkylene, C$_4$–C$_{12}$ alkenylene, xylylene, a divalent acyl radical of an aliphatic, cycloaliphatic, araliphatic or aromatic dicarboxylic acid or of a dicarbamic acid, when m is 3, R$_2$ is a trivalent acyl radical of an aliphatic, unsaturated aliphatic, cycloaliphatic, or aromatic tricarboxylic acid;

when m is 4, R$_2$ is a tetravalent acyl radical of a saturated or unsaturated aliphatic or aromatic tetracarboxylic acid;

p is 1, 2 or 3,

R$_3$ is hydrogen, C$_1$–C$_{12}$ alkyl, C$_5$–C$_7$ cycloalkyl, C$_7$–C$_9$ aralkyl, C$_2$–C$_{18}$ alkanoyl C$_3$–C$_5$ alkenoyl or benzoyl;

when p is 1,

R$_4$ is hydrogen, C$_1$–C$_{18}$ alkyl, C$_5$–C$_7$ cycloalkyl, C$_2$–C$_8$ alkenyl unsubstituted or substituted by a cyano, carbonyl or carbamide group, aryl, aralkyl, or it is glycidyl, a group of the formula —CH$_2$—CH(OH)—Z or of the formula —CONH—Z wherein Z is hydrogen, methyl or phenyl; or a group of the formulae piperidine structure with R, CH$_3$, CH$_2$R, N–OR$_1$, CH$_3$, CH$_2$R or HO–[di-tert-butylphenyl]–C(=O)–O–[di-tert-butylphenyl]–C(=O)–$]_h$ —with h as 0 or 1;

or R$_3$ or R$_4$ together when p is 1 can be alkylene of 4 to 6 carbon atoms or 2-oxapolyalkylene or the cyclic acyl radical of an aliphatic or aromatic 1,2- or 1,3-dicarboxylic acid, when p is 2, R$_4$ is a direct bond or is C$_1$–C$_{12}$ alkylene, C$_6$–C$_{12}$ arylene, xylylene, a —CH$_2$CH(OH)—CH$_2$ group, or a group —CH$_2$—CH(OH)—CH$_2$—O—X—O—CH$_2$—CH(OH)—CH$_2$— wherein X is C$_2$–C$_{10}$ alkylene, C$_6$–C$_{15}$ arylene or C$_6$–C$_{12}$ cycloalkylene; or, provided that R$_3$ is not alkanoyl, alkenoyl or benzoyl, R$_4$ can also be a divalent acyl radical of an aliphatic, cycloaliphatic or aromatic dicarboxylic acid or dicarbamic acid, or can be the group —CO—; or R$_4$ is triazine ring with N–T$_8$, T$_9$ substituent where T$_8$ and T$_9$ are independently hydrogen, alkyl of 1 to 18 carbon atoms, or T$_8$ and T$_9$ together are alkylene of 4 to 6 carbon atoms or 3-oxapentamethylene, when p is 3, R$_4$ is 2,4,6-triazinyl, n is 1 or 2, when n is 1, R$_5$ and R'$_5$ are independently C$_1$-C$_{12}$ alkyl, C$_2$-C$_{12}$ alkenyl, C$_7$-C$_{12}$ aralkyl, or R$_5$ is also hydrogen, or R$_5$ and R'$_5$ together are C$_2$-C$_8$ alkylene or hydroxyalkylene or C$_4$-C$_{22}$ acyloxyalkylene;

when n is 2,

R$_5$ and R'$_5$ together are (—CH$_2$)$_2$C(CH$_2$—)$_2$;

R$_6$ is hydrogen, C$_1$-C$_{12}$ alkyl, allyl, benzyl, glycidyl or C$_2$-C$_6$ alalkoxyaalky;

when n is 1,

R$_7$ is hydrogen, C$_1$-C$_{12}$ alkyl, C$_3$-C$_5$ alkenyl, C$_7$-C$_9$ aralkyl, C$_5$-C$_7$ cycloalkyl, C$_2$-C$_4$ hydroxyalkyl, C$_2$-C$_6$ alkoxyalkyl, C$_6$-C$_{10}$ aryl, glycidyl, a group of the formula —(CH$_2$)$_t$—COO—Q or of the formula —(CH$_2$)$_t$—O—CO—Q wherein t is 1 or 2, and Q is C$_1$-C$_4$ alkyl or phenyl; or when n is 2, R$_7$ is C$_2$-C$_{12}$ alkylene, C$_6$-C$_{12}$ arylene, a group —CH$_2$CH(OH)—CH$_2$—O—X—CH$_2$—CH(OH)—CH$_2$— wherein X is C$_2$-C$_{10}$ alkylene, C$_6$-C$_{15}$ arylene or C$_6$-C$_{12}$ cycloalkylene, or a group —CH$_2$CH(OZ')CH$_2$—(OCH$_2$—CH(OZ')CH$_2$)$_2$— wherein Z' is hydrogen, C$_1$-C$_{18}$ alkyl, allyl, benzyl, C$_2$-C$_{12}$ alkanoyl or benzoyl;

Q$_1$ is —N(R$_8$)— or —O—;

E is C$_1$-C$_3$ alkylene, the group CH$_2$—CH(R$_9$)—O— wherein R$_9$ is hydrogen, methyl or phenyl, the group —(CH$_2$)$_3$—NH— or a direct bond;

R$_{10}$ is hydrogen or C$_1$-C$_{18}$ alkyl;

R$_8$ is hydrogen, C$_1$-C$_{18}$ alkyl, C$_5$-C$_7$ cycloalkyl, C$_7$-C$_{12}$ aralkyl, cyanoethyl, C$_6$-C$_{10}$ aryl, the group —CH$_2$—CH(R$_9$)—OH wherein R$_9$ has the meaning defined above; a group of the formula

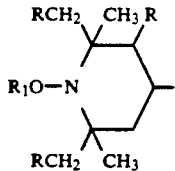

or a group of the formula

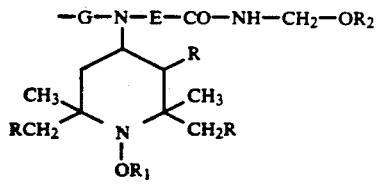

wherein G is C$_2$-C$_6$ alkylene or C$_6$-C$_{12}$ arylene R$_8$ is group —E—CO—NH—CH$_2$—OR$_{10}$;

T$_3$ is ethylene or 1,2-propylene, or is the repeating structural unit derived from an alpha-olefin copolymer with an alkyl acrylate or methacrylate;

k is 2 to 100;

T$_4$ has the same meaning as R$_4$ when p is 1 or 2,

T$_5$ is methyl,

T$_6$ is methyl or ethyl, or T$_5$ and T$_6$ together are tetramethylene or pentamethylene;

M and Y are independently methylene or carbonyl;

T$_7$ is the same as R$_7$;

T$_{10}$ and T$_{11}$ are independently alkylene of 2 to 12 carbon atoms, or T$_{11}$ is

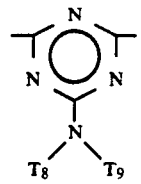

T$_{12}$ is piperazinyl,

or

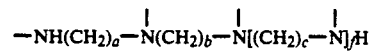

where R$_{11}$ is the same as R$_3$ or is also

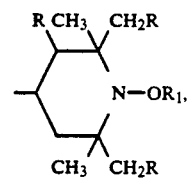

a, b and c are independently 2 or 3, and f is 0 or 1, e is 2, 3 or 4;

T$_{13}$ is the same as R$_2$ with the proviso that T$_{13}$ cannot be hydrogen when n is 1;

E$_1$ and E$_2$, being different, each are —CO— or —N(E$_5$)— wherein E$_5$ is hydrogen, C$_1$-C$_{12}$ alkyl or C$_4$-C$_{22}$ alkoxycarbonylalkyl;

E$_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms;

E$_4$ is hydrogen, alkyl of 1 to 30 carbon atoms, phenyl, naphthyl or phenylalkyl of 7 to 12 carbon atoms, or E$_3$ and E$_4$ together are polymethylene of 4 to 17 carbon atoms, or said polymethylene substituted by up to four alkyl groups of 1 to 4 carbon atoms;

R$_2$ of formula (N) is as previously defined when m is 1;

G$_1$ is a direct bond, C$_1$-C$_{12}$ alkylene, phenylene or —NH—G'—NH wherein G' is C$_1$-C$_{12}$ alkylene; and E$_6$ is an aliphatic or aromatic tetravalent radical.

2. The composition according to claim 1 wherein the compound of component (b) is selected from the group consisting of di-(1-acetoxy-2,2,6,6-tetramethylpiperidin-4-yl)phthalate, di-(1-acetoxy-2,2,6,6-tetramethylpiperidin-4-yl)isophthalate, di-(1-acetoxy-2,2,6,6-tetramethylpiperidin-4-yl) sebacate, di-(1-acetoxy-2,2,6,6-tetramethylpiperidin-4-yl) succinate, di-(1-acetoxy-2,2,6,6-tetramethylpiperidin-4-yl) adipate, di-(1-acetoxy-2,2,6,6-tetramethylpiperidin-4-yl) n-butylmalonate,
di-(1-acetoxy-2,2,6,6-tetramethylpiperidin-4-yl) 2,2-diethylmalonate,poly[6}[(1,1,3,3-tetramethylbutyl)-imino]-1,3,5-triazine-2,4-diyl][2-(1-acetoxy-2,2,6,6-tetramethylpiperidyl)-imino]-hexamethylene-[4-(1-acetoxy2,2,6,6-tetramethylpiperidyl)-imino]},
1,4-diacetoxy-2,2,6,6-tetramethylpiperidine,
1-acetoxy-4-hydroxy-2,2,6,6-tetramethylpiperidine,
di-(1-propionoxy-2,2,6,6-tetramethylpiperidine-4-yl)adipate,
di-(1-benzoyloxy-2,2,6,6-tetramethylpiperidine-4-yl)oxalate,
(1-acetoxy-2,2,6,6-tetramethylpiperidin-4-yl)-4-hydroxy-3,5-di-tert.butylbenzoate,
2-(4-hydroxy-3,5-di-tert.butylbenzyl)-2-(1-acetoxy-2,2,6,6-tetramethylpiperidin-4-yl) n-butylmalonate,
N-(1-acetoxy-2,2,6,6-tetramethylpiperidin-4-yl)N-(n-butyl)-4-(4-hydroxy-3,5-di-tert.butylbenzoyloxy)-3,5-di-tert.butylbenzamide,
1,6-di-(N-acetyl-N-(1-acetoxy-2,2,6,6-tetramethylpiperidin-4-yl)]aminohexane,
di-(1-acetoxy-2,2,6,6-tetramethylpiperidin-1-yloxy)-hexane-1,6-dicarbamate,
1-acetoxy-4-(N-acetyl-N-n-dodecylamino)-2,2,6,6-tetramethylpiperidine,
di-(1-propionoxy-2,2,6,6-tetramethylpiperidin-4-yl) succinate,
di-(4-n-octadecanoyloxy-2,2,6,6-tetramethylpiperazin-1-yl)oxalate,
1,4-di-(2-ethylhexanoyloxy)-2,2,6,6-tetramethylpiperidine,
di-(1-benzoyloxy-2,2,6,6-tetramethylpiperidin-4-yl) sebacate,
1-benzoyloxy-4-(N-n-butyl-N-benzoylamino)-2,2,6,6-tetramethylpiperidine,
1-(1-benzoyloxy-2,2,6,6-tetramethylpiperdin-4-yl)azepin-2-one,
1-benzoyloxy-1'-benzyloxy-di-(2,2,6,6-tetramethylpiperidin-4-yl)]isophthalate,
1,4-di-(4-hydroxy-3,5-di-tert-butylbenzoyloxy)-2,2,6,6-tetramethylpiperidine,
n-butyl-(1-benzoyloxy-2,2,6,6-tetramethylpiperidin-4-yl)carbonate,
1-carbamoyloxy-4-benzoyloxy-2,2,6,6-tetramethylpiperidine,
di(1 carbamoyloxy-2,2,6,6-tetramethylpiperidin4-yl)sebacate,
di-(1-n-butylcarbamoyloxy-2,2,6,6-tetramethylpiperidin-4-yl)2,2-diethylmalonate,
di-(4-benzoyloxy-2,2,6,6-tetramethylpiperidin-1-yl)-2,4,4-trimethylhexane-1,6-dicarbamate,
alpha,alpha'-(di-1-ethoxy-2,2,6,6-tetramethylpiperidin-4-yloxy)-p-xylene,
4-benzyloxy-1-ethoxy-2,2,6,6-tetramethylpiperidine,
1,4-dibenzyloxy-2,2,6,6-tetramethylpiperidine,
alpha,alpha'-(di-1-benzyloxy-2,2,6,6-tetramethylpiperidin-4-yloxy)-p-xylene,
di-(1-benzyloxy-2,2,6,6-tetramethylpiperidin-4-yl)sebacate,
4-benzoyloxy-1-(alpha-methylbenzyloxy)-2,2,6,6-tetramethylpiperidine,
di-[1-(alpha-methylbenzyloxy)-2,2,6,6-tetramethylpiperidin-4-yl]sebacate,
1,4-dimethoxy-2,2,6,6-tetramethylpiperidine,
4-benzoyloxy-1-methoxy-2,2,6,6-tetramethylpiperidine,
di-(1-methoxy-2,2,6,6-tetramethylpiperidin-4-yl) sebacate,
di-(1-methoxy-2,2,6,6-tetramethylpiperidin-4-yl)succinate,
(1-cyclohexyloxy-2,2,6,6-tetramethylpiperidin-4-yl)-3,5-di-t.butyl-4-hydroxybenzoate,
1-cyclohexyloxy-4-octadecanoyloxy-2,2,6,6-tetramethylpiperidine,
di-(1 methoxy-2,2,6,6-tetramethylpiperidin-4-yl)isophthalate,
di-(1-cyclohexyloxy-2,2,6,6-tetramethylpiperidin-4-yl)sebacate,
di-(1-cyclohexyloxy-2,2,6,6-tetramethylpiperidin-4-yl)isophthalate,
di-(1-heptyloxy-2,2,6,6-tetramethylpiperidin-4-yl)-sebacate,
di-[1-(alpha-methylbenzyloxy)-2,2,6,6-tetramethylpiperidin-4-yl]terephthalate,
di-(1-ethoxy-2,2,6,6-tetramethylpiperidin-4-yl)sebacate,
di-(1-cumyloxy-2,2,6,6-tetramethylpiperidin-4-yl)sebacate,
3,15-di-alpha methylbenzyloxy-2,2,4,4,14,14,16,16-octamethyl-7,11,18,21-tetraoxa-3,15-diazatrispiro[5.2.2.5.2.2]heneicosane,
3,15-dicyclohexyloxy-2,2,4,4,14,14,16,16-octamethyl7,11,18,21-tetraoxa-3,15-diazatrispiro[5.2.2.5.2.2]heneicosane,
di-(1-cyclohexyloxy-2,2,6,6-tetramethylpiperidin-4-yl)succinate,
di-[1-(alpha-methylbenzyloxy)-2,2,6,6-tetramethylpiperidin-4-yl]succinate,
di-(1 nonyloxy-2,2,6,6-tetramethylpiperidin-4-yl)sebacate,
di-(1-octadecyloxy-2,2,6,6-tetramethylpiperidin-4-yl)sebacate,
di-(1-nonyloxy-2,2,6,6-tetramethylpiperidin-4-yl)succinate,
di-[1-(1-methylcyclohexyloxy)-2,2,6,6-tetramethylpiperidin-4-yl]sebacate,
di-[1-(3-cyclohexen-1-yloxy)-2,2,6,6-tetramethylpiperidin-4-yl]sebacate,
di-(1-tert.butoxy-2,2,6,6-tetramethylpiperidin-4-yl)sebacate,
di-(1-carbamoyloxy-2,2,6,6-tetramethylpiperidin-4-yl)n-butylmalonate,
di-[1-(bicyclo-[4.4.0]-decyl-1-oxy)-2,2,6,6-tetramethylpiperidin-4-yl]sebacate,
di-(1-n-butylcarbamoyloxy-2,2,6,6-tetramethylpiperidin-4-yl)phthalate,
di-(1-n-butylcarbamoyloxy-2,2,6,6-tetramethylpiperidin-4-yl)n-butylmalonate,
di-(1-phenylcarbamoyloxy-2,2,6,6-tetramethylpiperidin-4-yl)sebacate,
4-benzoyloxy-1-benzyloxy-2,2,6,6-tetramethylpiperidine,
di-(1-methoxy-2,2,6,6-tetramethylpiperidin-4-yl)(3,5-di-tert.butyl-4-hydroxybenzyl) n-butylmalonate,
8-alpha-methylbenzyloxy-7,7,9,9-tetramethyl-8-aza1,4-dioxaspiro[4.5]decane,
di-(1-cyclohexyloxy-2,2,6,6-tetramethylpiperidin-4-yl)(3,5-di-tert.butyl-4-hydroxybenzyl) n-butylmalonate,
di-(1-octyloxy-2,2,6,6-tetramethylpiperidin-4-yl) sebacate,
di-(1 octyloxy-2,2,6,6-tetramethylpiperidin-4-yl) succinate, bis[N-(1 cyclohexyloxy-2,2,6,6-tetramethylpiperidin-4-yl)-n-butylamino]sebacamide, bis(1-cyclooctyloxy-2,2,6,6-tetramethylpiperidin-4-yl) sebacate, N,N',N'',N'''tetrakis2,4-bis[N-(1-cyclohexyloxy2,2,6,6-tetramethylpiperidin-4-yl)-n-butylamino]1,3,5-triazin-6-yl}3,3'-ethylenediiminodipropylamine, 2,4-bis[N-(1-cyclohexyloxy-2,2,6,6-tetramethyl-piperidin-4-yl)-n-butylamino]-6-t-octylamino-1,3,5-triazine, 2,4-bis[N-(1-cyclohexyloxy-2,2,6,6-tetramethyl-piperidin-4-yl)-6-morpholino-1,3,5-triazine, N,N'-bis(1-cyclohexyloxy-2,2,6,6-tetramethylpiperidine-4-yl)-N,N'-bis{2,4-bis[N-(1-cyclohexyloxy2,2,6,6'-tetramethyl-piperidin-4-yl)n-butylamino]1,3,5-triazin-6-yl}hexamethylenediamine, N,N'-bis{2,4-bis[N-(1-cyclohexyloxy-2,2,6,6-tetramethyl-piperidin-4-yl)-n-butylamino]-1,3,5-triazine6 yl}piperazine, N-(1-cyclohexyloxy-2,2,6,6-tetramethylpiperidin-4-yl) succinimide, 2,4,6-tris[N-(1-cyclohexyloxy-2,2,6,6-tetramethyl-piperidin-4-yl)-n-butylamino]-1,3,5-triazine, 2,4,6-tris[N-(1-methoxy-2,2,6,6-tetramethylpiperidin-4-yl)-n-butylamino]-1,3,5-triazine, and N,N',N'',N'''-tetrakis{2,4-bis[N-(1-octyloxy-2,2,6,6-{tetramethylpiperidin-4-yl)-n-butylamino]-1,3,5-triazin6-yl}-3,3'-ethylenediiminodipropylamine.

3. The composition of claim 2, wherein said compound is di-(1-benzyloxy-2,2,6,6-tetramethylpiperidin-4-yl)sebacate.

4. The composition of claim 2, wherein said compound is di-(1-methoxy-2,2,6,6-tetramethylpiperidin-4-yl) sebacate.

5. The composition of claim 2, wherein said compound is (1-cyclohexyloxy-2,2,6,6-tetramethylpiperidin-4-yl)-3,5-di-t.butyl-4-hydroxybenzoate.

6. The composition of claim 2, wherein said compound is di-(1-cyclohexyloxy-2,2,6,6-tetramethylpiperidin-4-yl)sebacate.

7. The composition of claim 2, wherein said compound is di-(1-heptyloxy-2,2,6,6-tetramethylpiperidin-4-yl)sebacate.

8. The composition of claim 2, wherein said compound is 3,15-dicyclohexyloxy-2,2,4,4,14,14,16,16-octamethyl7,11,18,21-tetraoxa-3,15-diazatrispiro[5.2.2.5.2.2]heneicosane.

9. The composition of claim 2, wherein said compound is di-(1-cyclohexyloxy-2,2,6,6-tetramethylpiperidin-4-yl)succinate.

10. The composition of claim 2, wherein said compound is di-(1-octadecyloxy-2,2,6,6-tetramethylpiperidin-4-yl)sebacate.

11. The composition of claim 2, wherein said compound is di-(1-octyloxy-2,2,6,6-tetramethylpiperidin-4-yl) sebacate.

12. The composition of claim 2, wherein said compound is di-(1-methoxy-2,2,6,6-tetramethylpiperidin-4-yl)isophthalate.

13. The composition of claim 2, wherein said compound is di-(1-methoxy-2,2,6,6-tetramethylpiperidin-4-yl)succinate.

14. The composition of claim 2, wherein said compound is di-(1-cyclohexyloxy-2,2,6,6-tetramethylpiperidin-4-yl)isophthalate.

15. The composition of claim 2, wherein said compound is N,N',N'',N'''-tetrakis{2,4-bis[N-(1 cyclohexyloxy-2,2,6,6-tetramethylpiperidin-4-yl)-n-butylamino]-1,3,5-triazin-6-yl}-3,3'-ethylenediiminodipropylamine.

16. The composition of claim 2, wherein said compound is di-(1-cyclohexyloxy-2,2,6,6-tetramethylpiperidin-4-yl)succinimide.

17. The composition according to claim 2, wherein said compound is 2,4,6-tris[N-(1-cyclohexyloxy-2,2,6,6-tetramethylpiperidin-4-yl)-n-butylamino]-1,3,5-triazine.

18. The composition according to claim 2, wherein said compound is 2,4,6-tris[N-(1-methoxy-2,2,6,6-tetramethylpiperidin-4-yl)-n-butylamino]-1,3,5-triazine.

19. The composition according to claim 2, wherein said compound is N,N',N'',N'''-tetrakis{2,4-bis[N-(1-octyloxy-2,2,6,6-tetramethylpiperidin-4-yl)-n-butylamino]1,3,5-triazin-6yl}-3,3'-ethylenediiminodipropylamine.

20. The composition of claim 1, wherein component (a) is a polyolefin which is a homopolymer or copolymer of an alpha-olefin.

21. The comopsition of claim 20, wherein the polyolefin is selected from the group consisting of polypropylene, low density polyethylene, medium density polyethylene, high density polyethylene, linear low density polyethylene, poly(butene-1), ethylene/vinyl acetate copolymer, ethylene/propylene copolymer and copolymers of ethylene or of propylene with other alpha-olefins.

22. The composition of claim 21, wherein the polyolefin is polypropylene, high density polyethylene, ethylene/propylene copolymer or a copolymer of ethylene or of propylene with another alpha-olefin.

23. The composition of claim 1 which additionally contains a phenolic antioxidant.

24. The composition of claim 1, which additionally contains a UV absorber selected from the group consisting of benzophenones, benzotriazoles, benzoic acid esters, acrylic acid derivatives, organic nickel compounds and oxanilides.

25. The composition of claim 23, which further contains a phosphite or phosphonite.

26. The composition of claim 1, which additionally contains a hydroxylamine costabilizer.

27. A method for stabilizing a polyolefin against oxidative, thermal and actinic degradation which comprises incorporating into said polyolefin an effective stabilizing amount of component (b) according to claim 1.

28. The composition of claim 1, which additionally contains a thiosynergist.

29. The composition of claim 20 which is in fiber form.

30. The composition of claim 1, which additionally contains a flame retardant.

31. The composition of claim 29, which additionally contains a flame retardant.

32. The composition of claim 1, which is in contact with or exposed to a halogenated or sulfur-containing-pesticide.

* * * * *